3,000,177
MULTIPLE-FLOW JET-PROPULSION ENGINES

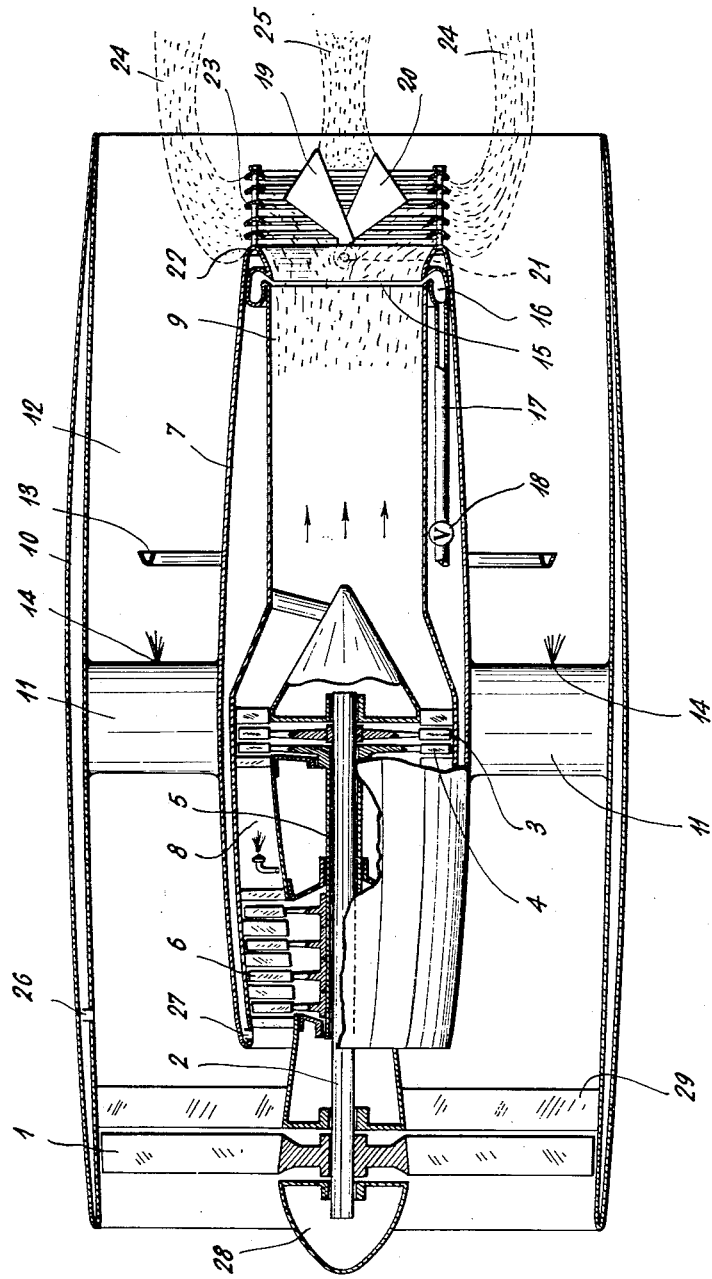

René Paul Logerot, Paris, and Hans Georg Munzberg, Dammarie les Lys, France, assignors to Societe Nationale d'Etude et de Construction de Moteurs d'Aviation, Paris, France, a French company
Filed July 5, 1957, Ser. No. 670,106
Claims priority, application France July 11, 1956
1 Claim. (Cl. 60—35.6)

The present invention relates to multiple-flow jet-propulsion engines, or groups thereof, such as turbo-jet units with double flow and combinations of turbo-jets and ram-jet units.

The advantage offered by the double-flow reaction engine, mainly in its application to taking-off and landing vertically, has led the applicants to make a study of an apparatus of as simple a design as possible whilst complying to the largest possible extent with all the conditions of operation, and having a low unit weight together with a low specific consumption and a high thrust.

The essential feature of this apparatus resides in the arrangement, at the outlet of the propulsion unit, of means adapted to deflect all or part of the internal flow into the external flow in order to apply to the latter flow an aerodynamic constriction effect similar to that which has been described in French Patent No. 1,030,483 of January 4, 1951.

The description which follows below with reference to the accompanying drawing, which is given by way of example only, and not in any sense by way of limitation, will make it quite clear how the invention may be carried into effect, the special features which are brought out, either in the text or in the drawing, being understood to form a part of the said invention.

The single figure of the drawing shows in axial cross-section an improved turbo-jet unit with double flow.

In the form of embodiment shown in the drawing, 1 is the low-pressure compressor, the shaft 2 of which is driven by a turbine wheel 3 rotating freely with respect to a second turbine wheel 4, coupled through the medium of a hollow shaft 5 to the high-pressure compressor 6 housed in the front portion of the inner cowling 7 which also houses the combustion chambers 8 supplying the gas turbine 3—4. This cowling is extended towards the rear so as to form an ejection channel 9 through which the gases escape after expansion in the turbine 3—4, thus producing a reaction jet. An outer cowling 10 coupled to the inner cowling 7 by radial arms 11 forms an annular conduit 12, through which flows the secondary or dilution flux of the propulsion unit.

The ratio of pressures of the secondary flow is chosen in such manner that combustion is possible in this latter flow at a given altitude and speed, for a pre-determined load of the high pressure portion 4—5—6, whilst maintaining an adequate equilibrium of the main variables in particular the speed of rotation of the low-pressure group 1—2—3.

The combustion in the center of the secondary flow in the annular conduit 12 is effected by means of a solid screen device 13 which serves to stabilize the flame of the fuel introduced through the injectors 14, carried for example on the arms 11.

The supply of fuel to the injectors 14 may be effected and controlled in such manner as to maintain constant, for a given load on the high-pressure group 4—5—6:

Either the speed of rotation of the low-pressure shaft 2 by means of an appropriate speed regulator (not shown) driven by the said shaft;

Or the ratio between the rates of flow of air in the secondary flow and the main flow by means of an aneroid capsule (not shown) co-operating with static pressure detectors 26 and 27 on the walls of each of the high-pressure and low-pressure streams, slightly on the downstream side of the zone of separation of the two flows;

Or at the same time, the speed of rotation of the shaft 2 and the ratio of the rates of flow of air by the combination of the two means referred to above.

The regulation of the main flow is effected by means of an aerodynamic constriction slot 15 supplied from a collector 16 which is coupled, through the medium of a conduit system 17 and a valve 18, to an appropriate supply of fluid, for example the high-pressure compressor 6 in the manner described in the French patent above referred to, the degree of opening of the valve 18 being subjected to the action of a suitable regulator.

The ejection channel 9 of the main flow is provided, in addition, with a jet-deflection device, for example one of those devices which form the subject of French Patents No. 1,010,405 of August 11, 1948, and 1,020,287 of June 16, 1950.

In the example shown in the drawing, the jet-deflection device consists of a solid obstacle formed by two cylindrical segments 19—20 pivoting about a shaft 21 at right angles to the axis of the propulsion-unit and being capable of taking-up a retracted position concentric with the ejection channel 9 and in the extension of the wall of the said channel, or a central position in which the two segments are brought together, or again in any position intermediate between the two positions referred to above. This mechanical obstacle is associated with a deflecting edge 22 formed by a convex extension of the extremity of the ejection channel 9, and with a grid of blades 23 to the rear of the said deflecting edge.

This deflecting device functions in the following manner:

When the segments or shutters 19 or 20 are in their retracted position concentric with the channel 9, the gases of the main flow escape from the said channel freely in an axial direction. On the other hand, by placing the flaps in their other extreme position in which they are in contact with each other, a solid obstacle is created in the main flow which is thereby deflected towards the deflection edge 22 and the grid of blades 23. For the intermediate positions of the flaps 19 and 20, for example that which is shown in the drawing, a portion 24 of the main flow is deflected laterally, whilst another portion of this flow, shown at 25, flows along the axis of the propulsion unit.

The deflected portion 24 of the main flow penetrates into the secondary flow, passing through the annular channel 12, with an appreciable component of speed at right angles to the direction of flow of the said secondary flux. For this reason, it applies to the latter a constrictive effect which reduces the cross-section of the passage available to this flow.

Thus, by varying simultaneously the adjustment of the flaps 19 and 20 from the concentric position to the central position, it is possible to deflect a more or less substantial part of the main jet into the secondary jet, reducing to a corresponding value the outlet cross-section available to this latter jet, which enables the combustion in the secondary flow to be adapted in such manner as to maintain a general equilibrium of the machine and in particular of the load on the high-pressure portion 4—5—6 and of the speed of rotation of the low-pressure portion 1—2—3, as will be explained later.

It is also possible to combine the constriction of the two flows by associating the control of the valve 18 with that of the flaps 19 and 20. This combination enables the outlet cross-section of the two flows to be adapted to the optimum operation of the machine, the main regulator which automatically adapts the outlet cross-section of the discharge nozzle 9 of the turbo-jet unit proper being able simultaneously to control the outlet cross-section of the secondary flow by action on the flaps 19 and 20.

The propulsion unit which has just been described operates in the following manner:

It will be assumed that the machine is in level flight, at a stable speed, under conditions of altitude and speed which are given, and for a pre-determined load, by the following parameters:

The speed of rotation of the high-pressure group 4—5—6;

The temperature on the upstream side of the turbines 3 and 4;

The totally-retracted position of the flaps 19 and 20.

These parameters determine in their turn a speed of rotation of the low-pressure group 1—2—3 and a temperature of combustion of the secondary flow, as well as internal variables such as the opening of the valves 18, that is to say a certain value of pneumatic constriction of the main flow.

In order that the operation of the propulsion group may be readily understood, it is assumed that at this moment it is desired to reduce the total thrust. To this end, the flow of fuel supplying the injectors 14 is reduced, which upsets the previous equilibrium of the machine. The speed of rotation of the low-pressure group 1—2—3 tends to increase, which brings into action the speed regulator which closes the flaps 19 and 20 by an amount which depends on the amount of reduction in flow of fuel; these flaps produce deflected jets 24 which apply a constrictive effect on the secondary flow and adapt the outlet cross-section of the conduit 12 to the new rate of flow of fuel. This reduction in the flow of fuel into the secondary flow also modifies the values of the speed of rotation of the high-pressure portion 4—5—6 and the temperature on the upstream side of the turbines, thus causing the action of the regulator of the turbo-jet unit proper, which regulator controls the valve 18 which governs the aerodynamic constriction of the main discharge nozzle 9.

The intervention of the two regulators restores the equilibrium of the machine for the new position of the flaps 19 and 20 and of the valve 18 and, of course, for the new rate of flow of fuel for the secondary flow.

It is to be noted that the reduction of the total thrust is thus obtained in a much more advantageous manner as regards the specific consumption than if action were effected by the reduction of the speed of operation characterised by the speed of rotation of the high-pressure group 4—5—6, the temperature of the combustion chambers 8 and the combustion in the secondary flow, with a constant outlet cross-section of the latter.

In the example which has just been described with reference to the drawing, the slot 15 is associated with the whole periphery of the channel 9 and serves exclusively for the constriction of this channel, whilst the flaps 19 and 20 with conjoint control occupy symmetrical positions which give deflected jets 24 also symmetrical and applying an action of pure constriction on the outer channel 12.

The present invention extends however to an alternative form which enables the production, in addition to the above constrictive effects, of control effects by the asymmetric action on the main and secondary flows. To this end, the single slot 15 is replaced by a number of slots distributed along the periphery of the channel 9 and each having its own supply valve; there may be provided with advantage four slots spaced 90° from each other, as described in French Patent No. 1,020,287 referred to above. In the same way, a separate control may be provided for each of the flaps 19 and 20 in order to permit of the adjustment of their position independently one from the other, and thus the production of deflected jets 24 of unequal size, together with an eccentric displacement of the central jet 25.

In this case, the constriction of the main flow is obtained by the simultaneous control of all the individual supply valves, or by the control of a single valve such as 18, the individual valves being then fully open. This control will be made to act in dependence on the regulator of the turbo-jet unit proper. On the other hand, the constriction of the secondary flow is effected by the simultaneous control of the flaps 19 and 20 in a symmetrical manner, whilst any control of a single flap or any asymmetric control of the two flaps will produce a partial deflection of the main jet into the secondary flow, thus creating an asymmetry or eccentricity which produces a controlling moment.

In other terms, the constriction of the main flow and the secondary flow is effected by a simultaneous and symmetrical control of the blowing slots and the flaps, which controls act in dependence on the corresponding regulators. On the contrary, the directional control is effected by a selective regulation of the supply of the blowing slots and of the flaps.

In addition, it is possible to provide a directional control which actuates the supply valves of the blowing slots and simultaneously the jacks or other regulating devices for the flaps which, in this case, will be of the same number as the blowing slots. The pneumatic constrction could also be controlled only by the regulator with the object of adapting the outlet section of the discharge nozzle 9, the directional control acting only on the flaps or spoilers and producing an eccentric displacement of the jet or jets.

It is to be observed that in this alternative form of the device in accordance with which the pneumatic constriction of the main flow also serves to make the jet eccentric according to piloting requirements, if the valves which regulate the flow of compressed air supplied to the blowing slots are actuated so as to effect a directional maneuver, the main regulator would also act correlatively on the main distribution valve and on the rate of flow of fuel to the combustion chambers 8, in order to correct the effect of partial constriction produced by the greater supply to one single blowing slot or to two adjacent slots, so as to maintain the speed of rotation of the high-pressure group 4—5—6 and the temperature on the upstream side of the turbine 3—4, whilst the regulator of the combustion of the secondary flow would act on the flow of fuel supplied to the injectors 14, and the general equilibrium would be thus maintained.

It is quite clear that to the arrangements referred to above there may be added various auxiliary devices such as:

A central body on the upstream side (or an external ring) which can be moved axially in order to adapt the section and the shape of the intake of the machine to the conditions of flight, instead of the fixed central body 28 which gives a constant section and a constant shape of intake;

A low-pressure compressor comprising an intake guide-wheel, a moving wheel of blades and an output guide-wheel, the blades of which may be given a variable orientation, instead of the moving blades 1 and the outlet guide-wheel 29 with fixed blades;

In the same way, one or a number of turbine distributors with blades having variable setting;

Ejection channels for the main flow and the secondary flow having variable cross-sections effected either mechanically or pneumatically;

Combustion of after-combustion devices for the main and secondary flows, with solid or fluid flame stabilizers (in this latter case, the supply fluid for the stabilizers may be derived from any point whatever of the high-pressure flow).

It will of course be understood that modifications may be made to the forms of embodiment which have been described above, in particular by the substitution of equivalent technical means, without thereby departing from the spirit or from the scope of the present invention.

In particular, the constriction device of the outer flow by total or partial deflection of the inner flow, which has been described in connection with the case of a turbo-jet unit with double flow, has a particularly useful application in combined propulsion units having a turbo-jet unit mounted inside the cowling of a ram-jet unit. In this latter case, the low-pressure compressor 1 is dispensed with, and the outer cowling 10 forms the casing of the ram-jet unit opening towards the front by a diffuser adapted to convert the relative air speed to pressure.

What is claimed is:

In a jet propulsion unit of the type including two co-axial motive streams normally discharging in the same direction and comprising an inner casing ending with an outlet and bounding the flow path of the inner motive stream, and an outer casing bounding with said inner casing the flow path of the outer motive stream, said latter flow path being of annular shape and extending to an exhaust section downstream of said outlet, the provision of an aerodynamically operating device for the control of the effective passage area of said outer motive stream, said device comprising a pair of controllable flaps pivotally supported at said outlet respectively for symmetrical swinging movement toward and away from each other across the inner motive stream issuing through said outlet and for substantial retraction from said inner motive stream on opposite sides thereof within said outlet for symmetrically diverting at least a fraction of said inner motive stream as it issues from said outlet into the flow path of said outer motive stream, upstream of said exhaust section, thereby forming a symmetric partial fluid obstruction across said outer motive stream and restricting the effective passage area thereof.

References Cited in the file of this patent

UNITED STATES PATENTS

| | | |
|---|---|---|
| 2,565,854 | Johnstone et al. | Aug. 28, 1951 |
| 2,589,548 | Imbert | Mar. 12, 1952 |
| 2,641,902 | Kerr | June 16, 1953 |
| 2,672,726 | Wolf et al. | Mar. 23, 1954 |
| 2,702,986 | Kadosch et al. | Mar. 1, 1955 |
| 2,807,137 | Meulien et al. | Sept. 24, 1957 |

FOREIGN PATENTS

| | | |
|---|---|---|
| 161,402 | Australia | Feb. 22, 1955 |
| 63,348 | France | Mar. 30, 1955 |
| | (Addition to No. 1,030,483) | |
| 65,303 | France | Oct. 5, 1955 |
| | (Addition to No. 1,030,483) | |
| 1,050,948 | France | Sept. 9, 1953 |
| 1,114,647 | France | Dec. 19, 1955 |
| 1,130,131 | France | Sept. 17, 1956 |
| 745,673 | Great Britain | Feb. 29, 1956 |